United States Patent
Nakahara

(10) Patent No.: US 8,861,085 B2
(45) Date of Patent: Oct. 14, 2014

(54) FIXED FOCAL LENGTH LENS HAVING IMAGE STABILIZATION FUNCTION AND OPTICAL APPARATUS

(75) Inventor: Makoto Nakahara, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 148 days.

(21) Appl. No.: 13/198,106

(22) Filed: Aug. 4, 2011

(65) Prior Publication Data

US 2012/0033300 A1 Feb. 9, 2012

(30) Foreign Application Priority Data

Aug. 6, 2010 (JP) .................................. 2010-177018

(51) Int. Cl.
- *G02B 27/64* (2006.01)
- *G02B 13/18* (2006.01)
- *G02B 9/08* (2006.01)

(52) U.S. Cl.
CPC . *G02B 27/64* (2013.01); *G02B 9/08* (2013.01); *G02B 27/646* (2013.01); *G02B 13/18* (2013.01)
USPC ............ 359/557; 359/554; 359/749; 359/793

(58) Field of Classification Search
CPC ............ G02B 9/04; G02B 9/08; G02B 27/64; G02B 27/646
USPC .................. 359/554–557, 745–795, 676–692, 359/738–740
See application file for complete search history.

(56) References Cited

U.S. PATENT DOCUMENTS

| | | | | |
|---|---|---|---|---|
| 5,579,160 | A * | 11/1996 | Sato | 359/557 |
| 5,627,677 | A * | 5/1997 | Suzuki | 359/557 |
| 5,657,677 | A | 8/1997 | Cuir et al. | |
| 5,917,663 | A * | 6/1999 | Suzuki | 359/749 |
| 6,894,847 | B2 * | 5/2005 | Suzuki | 359/749 |
| 7,583,441 | B2 * | 9/2009 | Taki | 359/557 |
| 2013/0258476 | A1 * | 10/2013 | Mizuma | 359/557 |

FOREIGN PATENT DOCUMENTS

| | | |
|---|---|---|
| JP | 08-220427 A | 8/1996 |
| JP | 2005-173298 A | 6/2005 |
| JP | 2009-048012 A | 3/2009 |

(Continued)

OTHER PUBLICATIONS

Notification of the First Office Action for corresponding CN 201110219007.9, dated Jun. 27, 2013. English translation provided.

*Primary Examiner* — Thong Nguyen

(74) *Attorney, Agent, or Firm* — Rossi, Kimms & McDowell LLP

(57) ABSTRACT

A fixed focal length lens has a focal length of a whole system shorter than a back focus. The fixed focal length lens includes an aperture stop, and an image-stabilizing lens unit that moves in a direction including a component of a direction orthogonal to an optical axis to reduce an image blur. The conditions of $0.1<f/|fis|<0.5$ and $-0.35<Dis/DL<0.25$ are met, where f is the focal length of the whole system, fis is a focal length of the image-stabilizing lens unit, Dis is a distance from the aperture stop to a surface farthest from the aperture stop of the image-stabilizing lens unit, and DL is a distance from a first surface closest to an object side to a final surface closest to an image side of the fixed focal length lens. A sign of the distance is positive in a direction from the object side to the image side.

5 Claims, 11 Drawing Sheets

(56) References Cited

FOREIGN PATENT DOCUMENTS

| JP | 2009-150970 A | 7/2009 |
| JP | 2010-014897 A | 1/2010 |
| JP | 2010-072359 A | 4/2010 |
| JP | 2010-170063 A | 8/2010 |

\* cited by examiner

REFERENCE STATE | IMAGE STABILIZATION STATE BY 0.5 DEGREE

REFERENCE STATE IMAGE STABILIZATION STATE BY 0.5 DEGREE

FIXED FOCAL LENGTH LENS HAVING IMAGE STABILIZATION FUNCTION AND OPTICAL APPARATUS

BACKGROUND OF THE INVENTION

1. Field of the Invention

The present invention relates to a fixed focal length lens having an image stabilization function that reduces an image blur, and more particularly to a fixed focal length lens suitably used as an imaging optical system of an image pickup apparatus such as a digital still camera or a video camera.

2. Description of the Related Art

Some optical apparatus such as an image pickup apparatus or an interchangeable lens have an image stabilization function that moves a part of lens units constituting an imaging optical system in a direction including a component of a direction orthogonal to an optical axis in order to reduce an image blur caused by a vibration such as a hand shake during taking an image.

Such an image stabilization function can also be applied to a fixed focal length wide-angle lens of a so-called retro focus type in which a focal length of a whole system is shorter than a back focus. Japanese Patent Laid-Open No. H8-220427 discloses a wide-angle lens that is configured by a first lens unit having a negative refractive power and a second lens unit having a positive refractive power and that rotates two positive lenses of the second lens unit around a point on an optical axis to perform image stabilization.

However, in the wide-angle lens disclosed in Japanese Patent Laid-Open No. H8-220427, since an image-stabilizing lens unit is disposed at the position closest to an image plane, a principal ray position of an off-axis ray gets higher, and a diameter of the image-stabilizing lens unit is also enlarged. Furthermore, an aberration correction during the image stabilization is insufficient.

SUMMARY OF THE INVENTION

The present invention provides a fixed focal length lens capable of reducing the size of an image-stabilizing lens unit and also correcting aberrations appropriately.

A fixed focal length lens as one aspect of the present invention has a focal length of a whole system that is shorter than a back focus. The fixed focal length lens includes an aperture stop, and an image-stabilizing lens unit configured to move in a direction including a component of a direction orthogonal to an optical axis to reduce an image blur.

The following conditions are met:

$$0.1 < f/|fis| < 0.5$$

$$-0.35 < Dis/DL < 0.25$$

where f is the focal length of the whole system of the fixed focal length lens, fis is a focal length of the image-stabilizing lens unit, Dis is a distance on the optical axis from the aperture stop to a surface farthest from the aperture stop of the image-stabilizing lens unit, DL is a distance on the optical axis from a first surface closest to an object side to a final surface closest to an image side of the fixed focal length lens, and a sign of the distance on the optical axis is positive in a direction from the object side to the image side.

An optical apparatus including the fixed focal length lens also constitutes another aspect of the present invention.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

First of all, before describing specific embodiments, matters common to each embodiment will be described. A fixed focal length lens is a so-called retro-focus-type lens in which a lens unit having a negative refractive power is disposed at the position closest to an object side and a lens unit having a positive refractive power is disposed at an image side.

In such a lens, an image side principal point is easily positioned at the image side relative to a final surface at the position closest to the image side (a final lens surface), and a wide-angle lens that has a focal length of a whole lens system smaller than a back focus that is a length from the final surface to an image plane can be achieved. Such a lens is particularly effective to make the wide-angle lens in which a long back focus needs to be ensured such as a lens used for a single-lens reflex camera in which a quick return mirror is disposed at the image side relative to the lens.

In the wide-angle lens as described in the embodiment, a lens diameter near an aperture stop can be easily reduced in the whole lens system. Commonly, a height from an optical axis of an off-axis lay that reaches the maximum image height on the image plane gets higher with increasing distance from the aperture stop, and its tendency is remarkable in the wide-angle lens as described in the embodiment.

In order to improve an optical performance while a light intensity sufficient to the off-axis ray is ensured in such a wide-angle lens, it is preferred that the off-axis ray be set so as not to be cut by the aperture stop that determines an open F-number light beam. Therefore, it is preferred that the aperture stop be disposed near the center of the whole lens system instead of disposing it near a first surface (a first lens surface) at the position closest to the object side in the whole lens system or near the final surface at the position closest to the image side. Thus, the principal ray of the off-axis ray intersects with the optical axis near the aperture stop, and as a result the diameter of the lens unit which is disposed near the aperture stop can be reduced.

In the embodiment, the lens unit that is disposed near the aperture stop is used as an image-stabilizing lens unit that is displaced in a direction including a component of a direction orthogonal to the optical axis to reduce (correct) an image blur. Thus, the reduction of the size of the image-stabilizing lens unit is achieved, and holding mechanism and driving mechanism of the image-stabilizing lens unit can be simplified. Furthermore, since the height of the off-axis ray which passes the inside of the image-stabilizing lens unit is lowered by disposing the image-stabilizing lens unit near the aperture stop, an aberration variation in the vicinity of the image plane (a display) can be reduced during the stabilizing operation.

Figure 1:
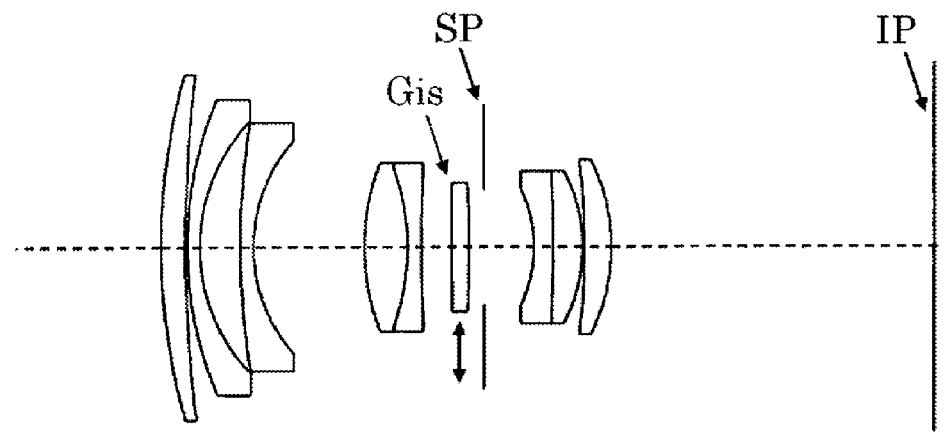
FIG. 1 is a cross-sectional diagram of a fixed focal length lens in Embodiment 1 (Numerical example 1) of the present invention.
Figure 2A:
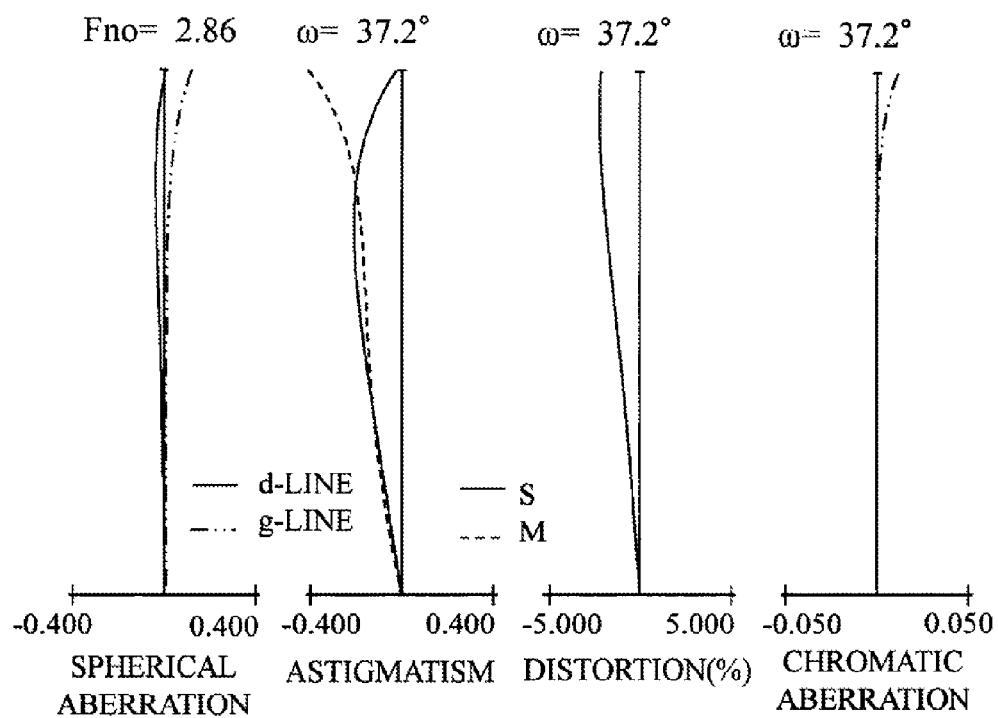
FIG. 2A is a vertical aberration diagram of Numerical example 1.
Figure 2B:
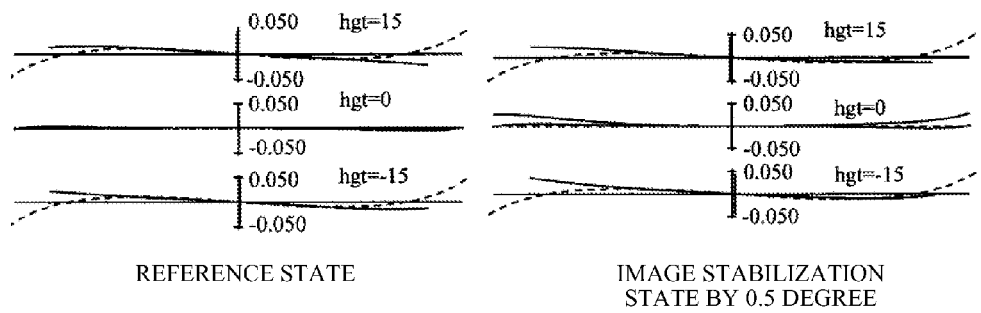
FIG. 2B is a lateral aberration diagram of Numerical example 1.

FIG. 1 illustrates a cross-sectional configuration of the wide-angle lens (the fixed focal length lens) that is Embodiment 1 of the present invention. FIG. 2A illustrates a vertical aberration diagram of the wide-angle lens in Numerical example 1 that corresponds to Embodiment 1, and FIG. 2B illustrates a lateral aberration diagram in a reference state and in an image stabilization state by 0.5 degree. The vertical aberration diagram illustrates a vertical aberration in a state during focusing on the infinity, and the same is applied to other numerical examples.

Figure 3:
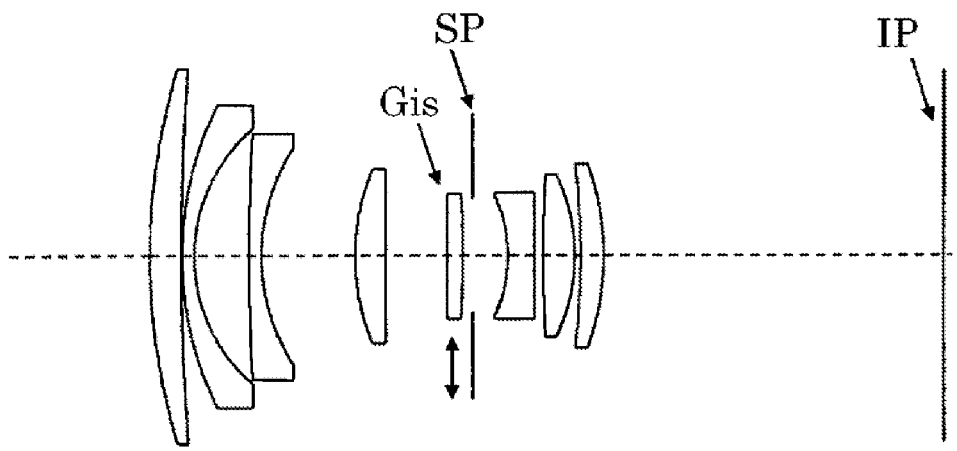
FIG. 3 is a cross-sectional diagram of a fixed focal length lens in Embodiment 2 (Numerical example 2) of the present invention.
Figure 4A:
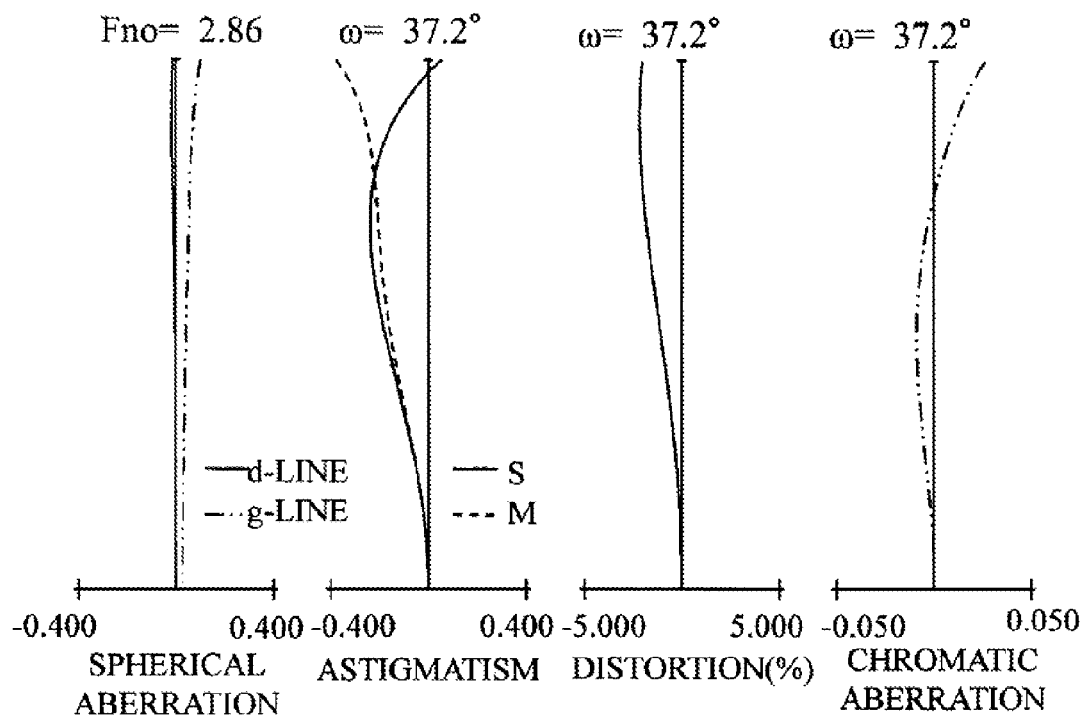
FIG. 4A is a vertical aberration diagram of Numerical example 2.
Figure 4B:
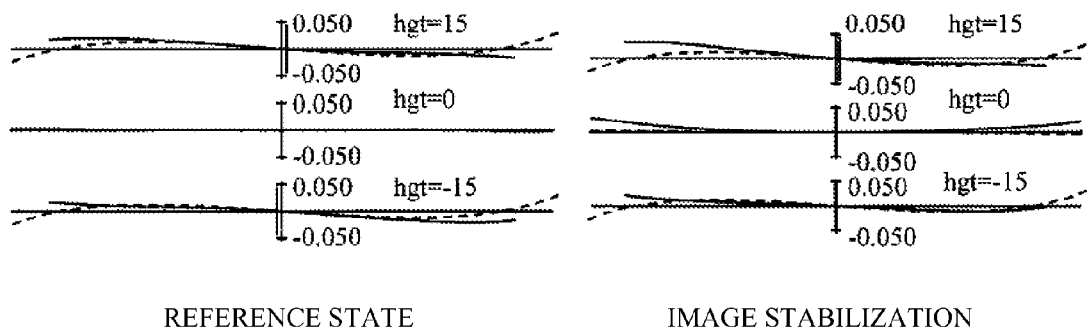
FIG. 4B is a lateral aberration diagram of Numerical example 2.

FIG. 3 illustrates a cross-sectional configuration of the wide-angle lens (the fixed focal length lens) that is Embodiment 2 of the present invention. FIG. 4A illustrates a vertical aberration diagram of the wide-angle lens in Numerical example 2 that corresponds to Embodiment 2, and FIG. 4B illustrates a lateral aberration diagram in a reference state and in an image stabilization state by 0.5 degree.

Figure 5:
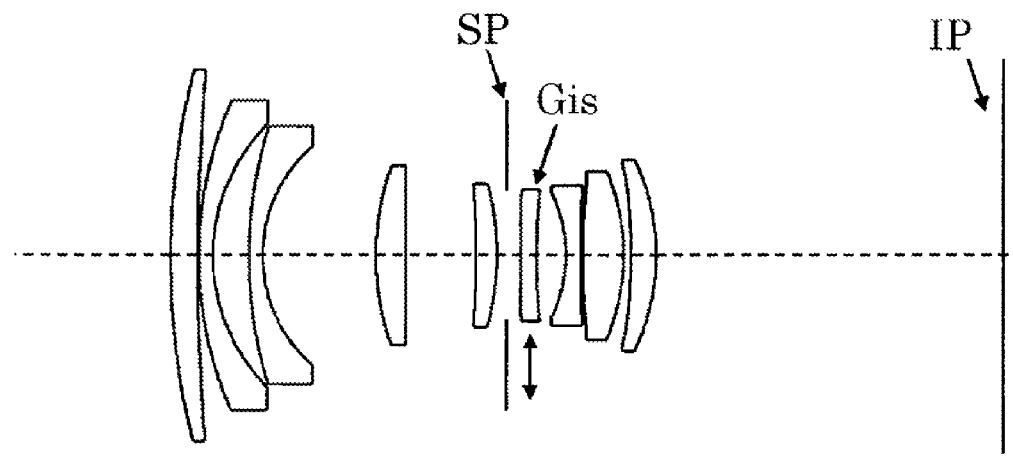
FIG. 5 is a cross-sectional diagram of a fixed focal length lens in Embodiment 3 (Numerical example 3) of the present invention.
Figure 6A:
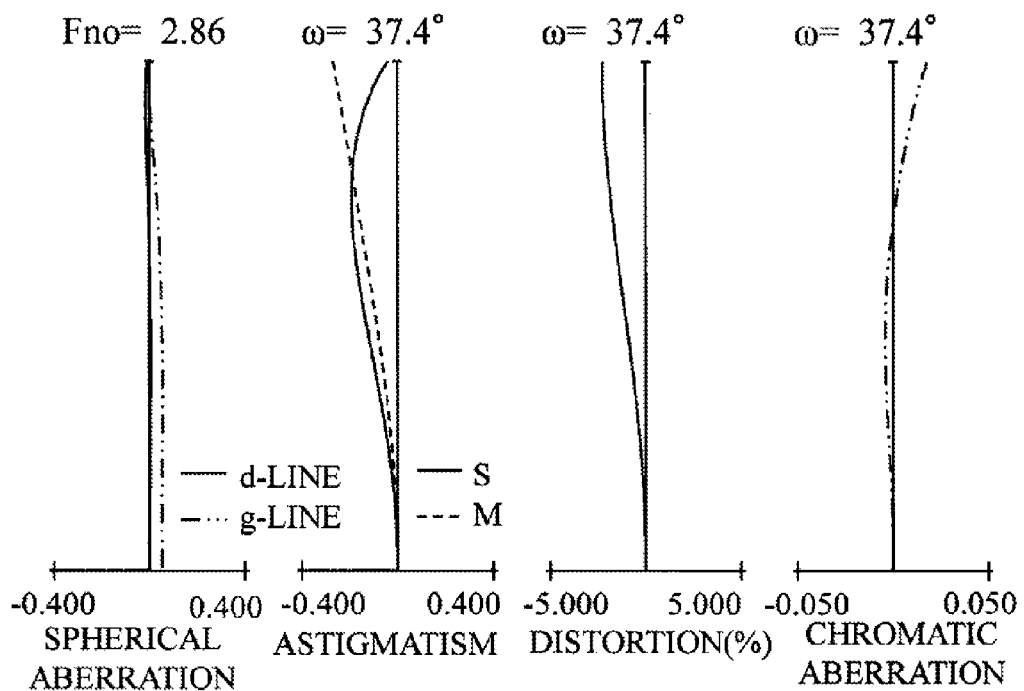
FIG. 6A is a vertical aberration diagram of Numerical example 3.
Figure 6B:
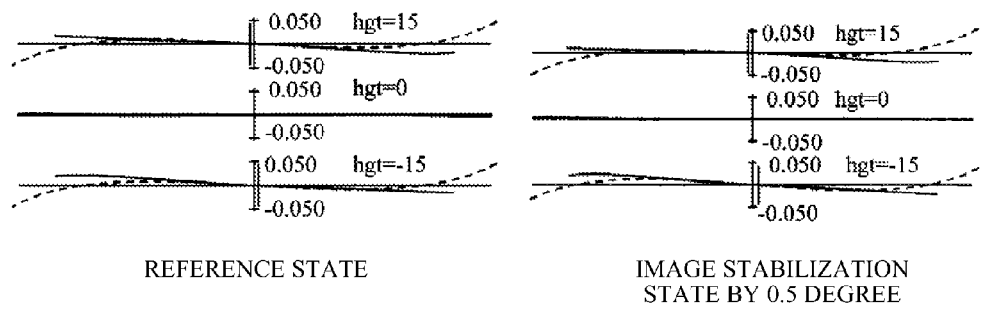
FIG. 6B is a lateral aberration diagram of Numerical example 3.

FIG. 5 illustrates a cross-sectional configuration of the wide-angle lens (the fixed focal length lens) that is Embodiment 3 of the present invention. FIG. 6A illustrates a vertical aberration diagram of the wide-angle lens in Numerical example 3 that corresponds to Embodiment 3, and FIG. 6B illustrates a lateral aberration diagram in a reference state and in an image stabilization state by 0.5 degree.

Figure 7:
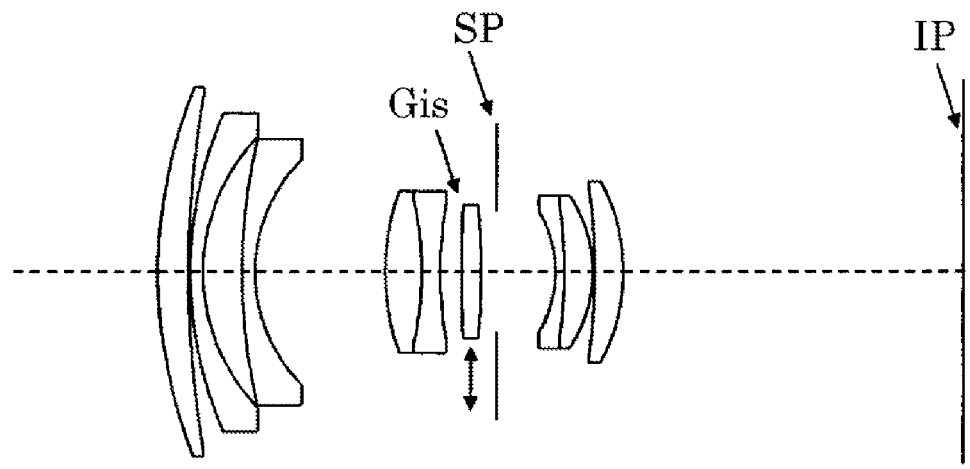
FIG. 7 is a cross-sectional diagram of a fixed focal length lens in Embodiment 4 (Numerical example 4) of the present invention.
Figure 8A:
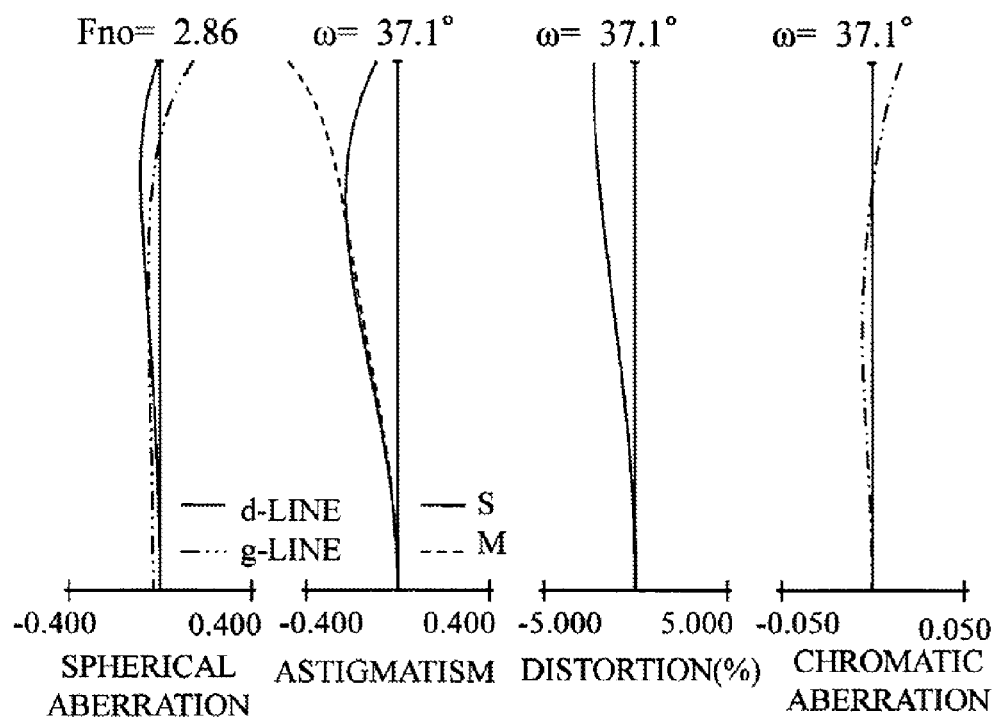
FIG. 8A is a vertical aberration diagram of Numerical example 4.
Figure 8B:
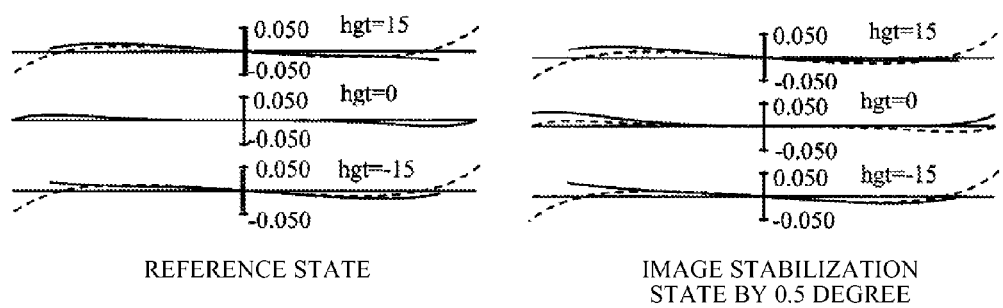
FIG. 8B is a lateral aberration diagram of Numerical example 4.

FIG. 7 illustrates a cross-sectional configuration of the wide-angle lens (the fixed focal length lens) that is Embodiment 4 of the present invention. FIG. 8A illustrates a vertical aberration diagram of the wide-angle lens in Numerical example 4 that corresponds to Embodiment 4, and FIG. 8B illustrates a lateral aberration diagram in a reference state and in an image stabilization state by 0.5 degree.

Figure 9:
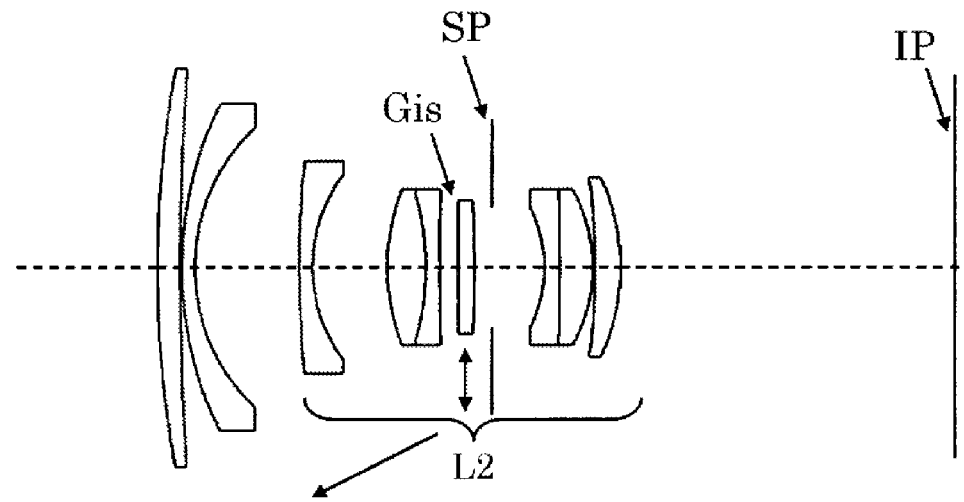
FIG. 9 is a cross-sectional diagram of a fixed focal length lens in Embodiment 5 (Numerical example 5) of the present invention.
Figure 10A:
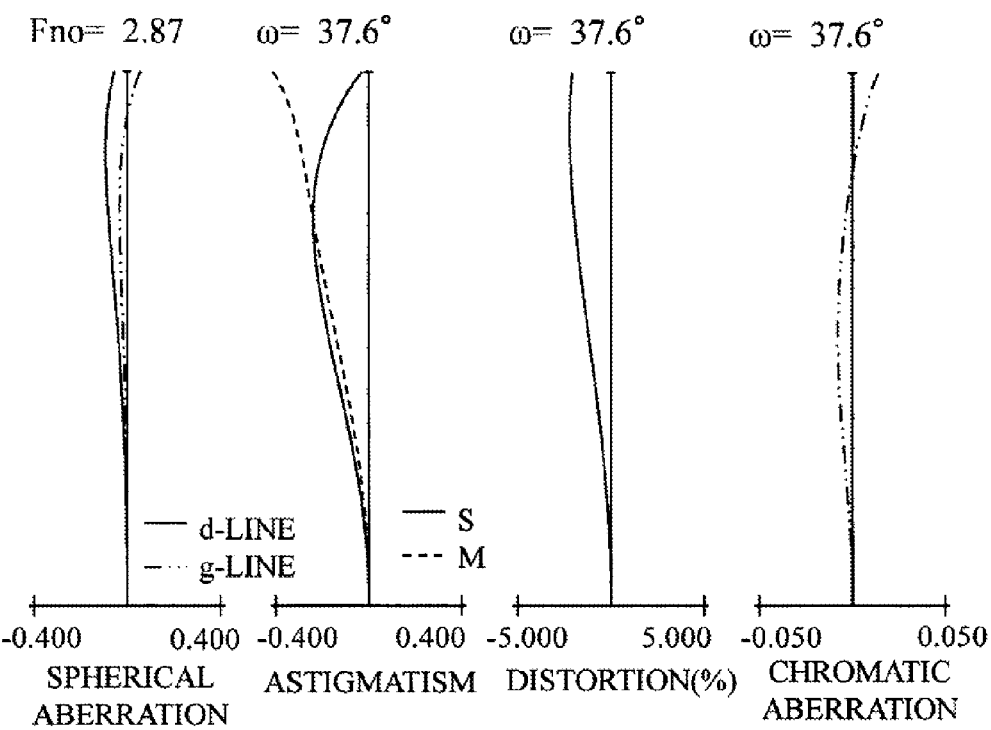
FIG. 10A is a vertical aberration diagram of Numerical example 5.
Figure 10B:
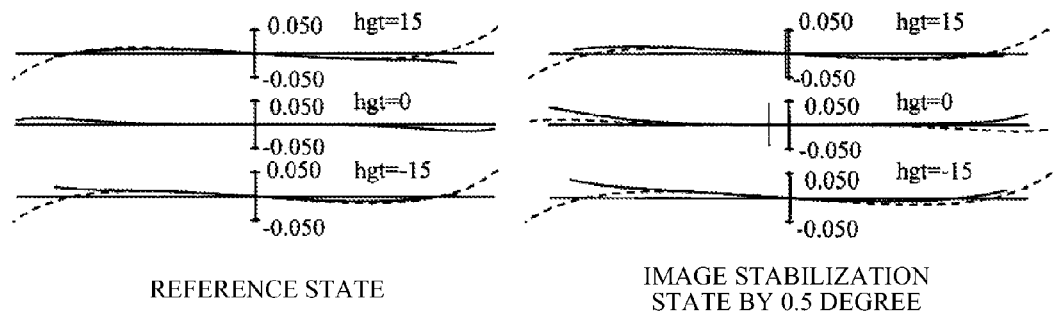
FIG. 10B is a lateral aberration diagram of Numerical example 5.

FIG. 9 illustrates a cross-sectional configuration of the wide-angle lens (the fixed focal length lens) that is Embodiment 5 of the present invention. FIG. 10A illustrates a vertical aberration diagram of the wide-angle lens in Numerical example 5 that corresponds to Embodiment 5, and FIG. 10B illustrates a lateral aberration diagram in a reference state and in an image stabilization state by 0.5 degree.

Figure 11:
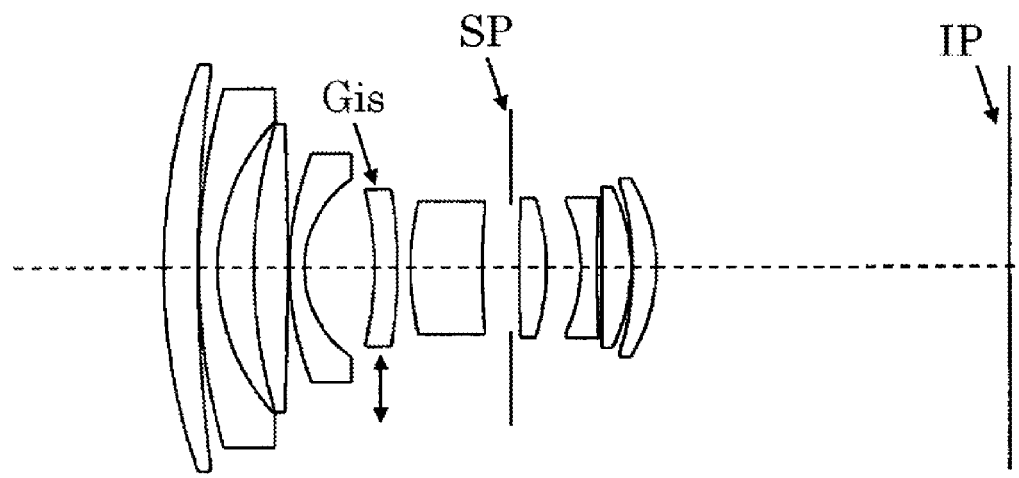
FIG. 11 is a cross-sectional diagram of a fixed focal length lens in Embodiment 6 (Numerical example 6) of the present invention.
Figure 12A:
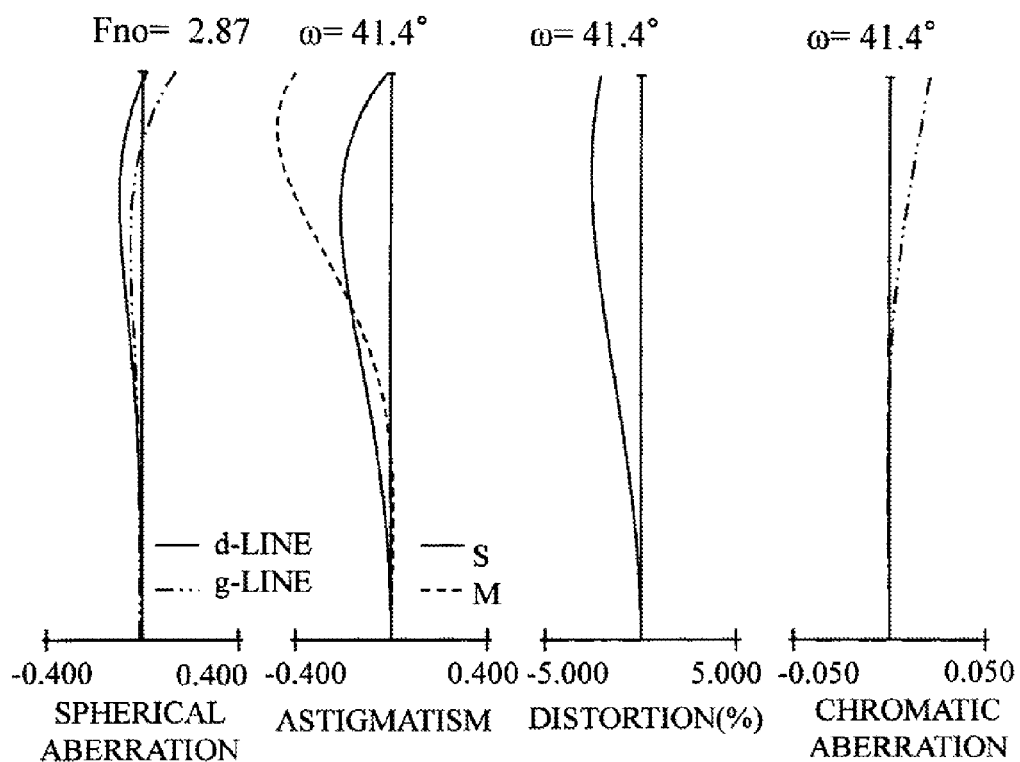
FIG. 12A is a vertical aberration diagram of Numerical example 6.
Figure 12B:
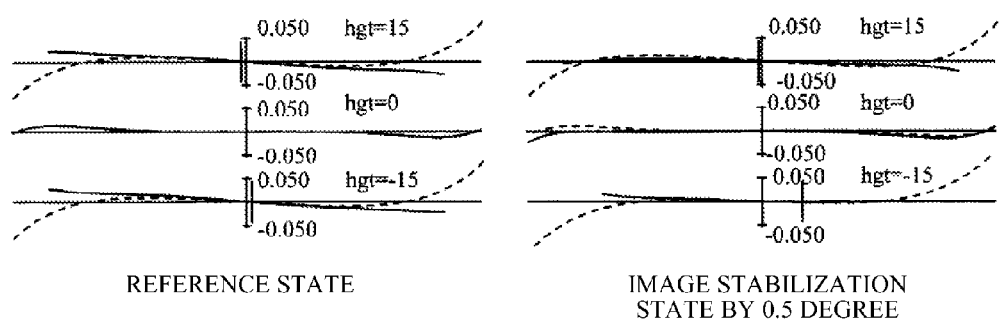
FIG. 12B is a lateral aberration diagram of Numerical example 6.

FIG. 11 illustrates a cross-sectional configuration of the wide-angle lens (the fixed focal length lens) that is Embodiment 6 of the present invention. FIG. 12A illustrates a vertical aberration diagram of the wide-angle lens in Numerical example 6 that corresponds to Embodiment 6, and FIG. 12B illustrates a lateral aberration diagram in a reference state and in an image stabilization state by 0.5 degree.

Figure 13:
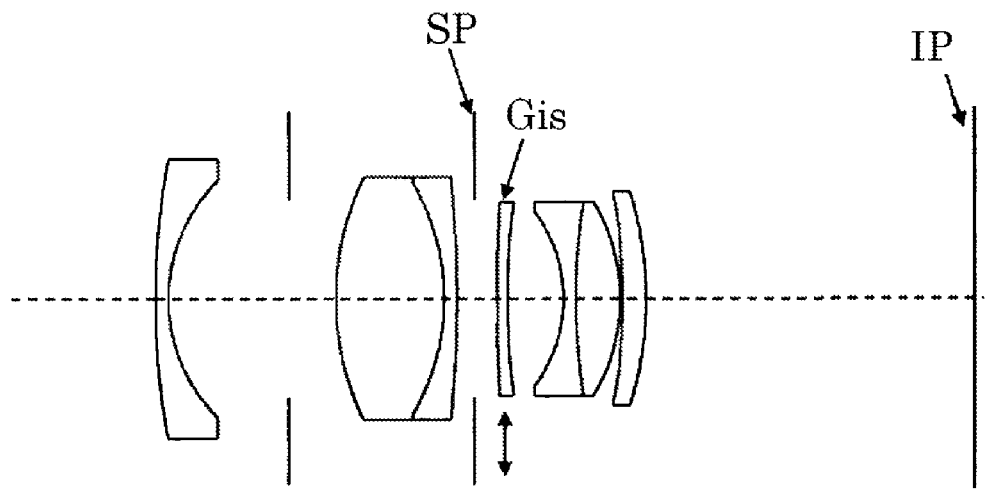
FIG. 13 is a cross-sectional diagram of a fixed focal length lens in Embodiment 7 (Numerical example 7) of the present invention.
Figure 14A:
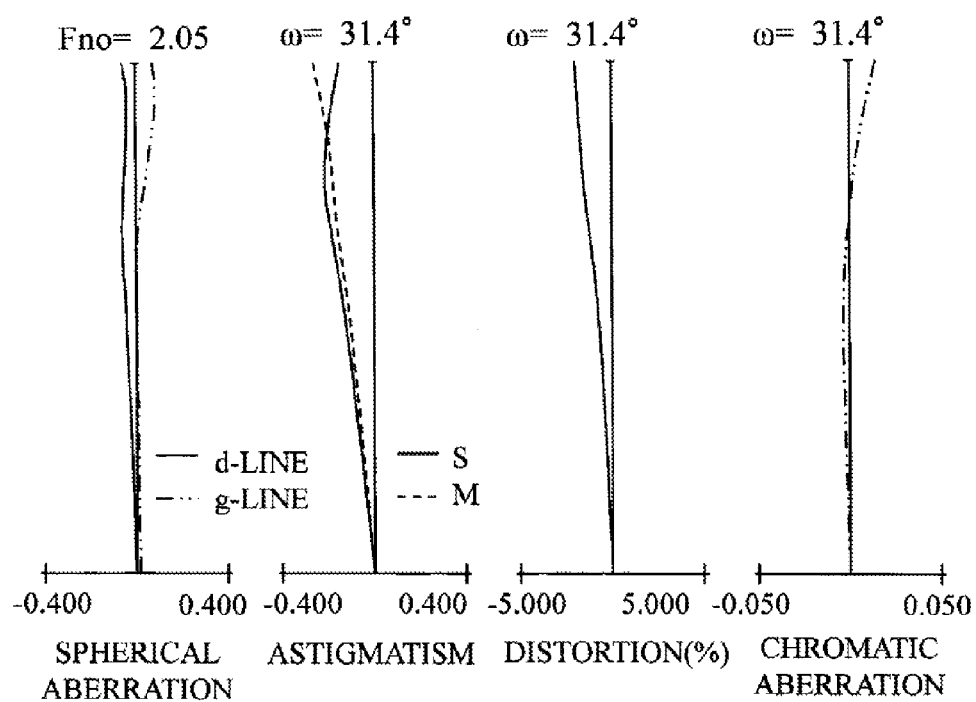
FIG. 14A is a vertical aberration diagram of Numerical example 7.
Figure 14B:
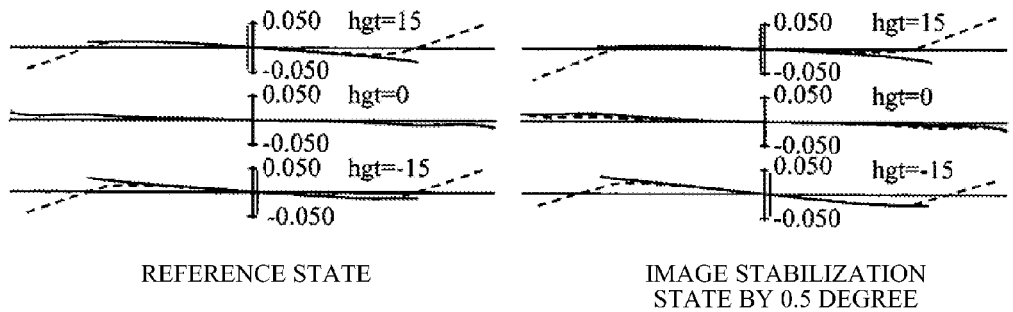
FIG. 14B is a lateral aberration diagram of Numerical example 7.

FIG. 13 illustrates a cross-sectional configuration of the wide-angle lens (the fixed focal length lens) that is Embodiment 7 of the present invention. FIG. 14A illustrates a vertical aberration diagram of the wide-angle lens in Numerical example 7 that corresponds to Embodiment 7, and FIG. 14B illustrates a lateral aberration diagram in a reference state and in an image stabilization state by 0.5 degree.

The wide-angle lens in each embodiment constitutes an imaging optical system that is used for an optical apparatus of an image pickup apparatus such as a still camera or a video camera or an interchangeable lens for a single-reflex camera. In the lens cross-sectional diagram of each embodiment, the left side indicates an object side (a front side) and the right side indicates an image side (a rear side).

In the lens cross-sectional diagram of each embodiment, Reference symbol Gis denotes the image-stabilizing lens unit, and reference symbol SP denotes the aperture stop (hereinafter, referred to simply as a stop). Reference symbol IP denotes the image plane on which an imaging surface or a film of an image pickup element (a photoelectric conversion element) such as a CCD sensor or a CMOS sensor that is mounted in the image pickup apparatus is disposed.

Each vertical aberration diagram, in order from the left, indicates spherical aberration, astigmatism, distortion, and chromatic aberration of magnification. In the drawings illustrating the spherical aberration and the chromatic aberration of magnification, a solid line indicates d-line (587.6 nm) and a dashed line indicates g-line (435.8 nm). In the drawings illustrating the astigmatism, a solid line indicates a sagittal direction ΔS of the d-line and a dashed line indicates a meridional direction ΔM of the d-line. The drawings illustrating the distortion indicate distortion for the d-line. In the lateral cross-sectional diagrams, a solid line indicates the meridional direction ΔM of the d-line and a dashed line indicates the sagittal direction ΔS of the d-line. Reference symbols Fno, ω, and hgt denote an F-number, a half angle of field, and an image height, respectively.

In each embodiment, the image-stabilizing lens unit Gis is displaced in a direction including a component of a direction orthogonal to the optical axis to perform an image stabilization in which an image blur caused by a vibration such as a hand shake is corrected. The term of "a direction including a component of a direction orthogonal to the optical axis" includes a direction shifted in the direction orthogonal to the optical axis (for example, a direction inclined with respect to the direction orthogonal to the optical axis or a rotating direction around a point on the optical axis), as well as the direction orthogonal to the optical axis. Furthermore, each embodiment has the configuration that meets the following conditions (1) and (2).

$$0.1 < f/|fis| < 0.5 \quad (1)$$

$$-0.35 < Dis/DL < 0.25 \quad (2)$$

In the conditions (1) and (2), f is a focal length of a whole system of the wide-angle lens, fis is a focal length of the image-stabilizing lens unit Gis. Dis is a distance on the optical axis from the stop SP to the farthest plane (a lens surface) relative to the stop SP of the image-stabilizing lens unit Gis. Furthermore, DL is a distance on the optical axis from the first surface closest to the object side to the final surface closest to the image side of the wide-angle lenses. The sign of "the distance on the optical axis" is positive in a direction from the object side to the image side and is negative in the opposite direction (the direction from the image side to the object side).

Condition (1) is a condition that needs to be met in order to appropriately set a refractive power of the image-stabilizing lens unit Gis with respect to a focal length of the whole system of the wide-angle lens. When the refractive power of the image-stabilizing lens unit Gis becomes strong so that a value of f/|fis| is beyond the upper limit of Condition (1), decentering aberration is frequently generated in performing the image stabilization to deteriorate the optical performance. Furthermore, since a change amount of an image position with respect to a displacement amount of the image-stabilizing lens unit Gis (hereinafter, referred to as an image stabilization sensitivity) increases, the displacement amount of the image-stabilizing lens unit Gis for obtaining a required image stabilization effect is so small that it is difficult to control the displacement amount electrically or mechanically with high accuracy.

When the refractive power of the image-stabilizing lens unit Gis is weakened so that the value of f/|fis| is under the lower limit of Condition (1), the image stabilization sensitivity is too small and the displacement amount of the image-stabilizing lens unit Gis for the image stabilization increases, and therefore it is not preferred because the size of the driving mechanism is enlarged.

It is more preferred that a numerical range of Condition (1) be set as follows.

$$0.11 < f/|fis| < 0.31 \quad (1a)$$

Condition (2) is a condition that needs to be met in order to appropriately set the distance on the optical axis from the stop SP to the plane which is the farthest relative to the stop SP of the image-stabilizing lens unit Gis. When the image-stabilizing lens unit Gis gets away to the image side relative to the stop SP so that the value of Dis/DL is beyond the upper limit of Condition (2), it is not preferred because the image-stabilizing lens unit Gis gets larger. Furthermore, the height of the off-axis ray passing through the image-stabilizing lens unit Gis from the optical axis is higher, and it is not preferred because the aberration correction of the off-axis ray is difficult during the image stabilization.

When the image-stabilizing lens unit Gis gets away from the stop SP to the object side so that the value of Dis/DL is under the lower limit of Condition (2), it is not preferred because the image-stabilizing lens unit Gis gets larger. Furthermore, the height of the off-axis ray passing through the image-stabilizing lens unit Gis from the optical axis is higher, and it is not preferred because the aberration correction of the off-axis ray is difficult during the image stabilization.

It is more preferred that a numerical range of Condition (2) be set as follows.

$$-0.28 < Dis/DL < 0.07 \quad (2a)$$

The wide-angle lens that has the image-stabilizing lens unit Gis easily reduced in size and that can obtain a good image during the image stabilization while having a high optical performance is obtained by meeting the above conditions.

In each embodiment, it is more preferred that the following Condition (3) be met in order to further improve the optical performance during the image stabilization.

$$0.1 < |(1-\beta is)\beta r| < 0.65 \quad (3)$$

In Condition (3), βis a lateral magnification of the image-stabilizing lens unit Gis, and βr is a lateral magnification of a lens system that is positioned at the image side relative to the image-stabilizing lens unit Gis. Each lateral magnification is a value in a state where the whole of the wide-angle lens system focuses on the infinity (the infinity object).

Condition (3) is a condition that needs to be met in order to appropriately set a ratio of the displacement amount of the image-stabilizing lens unit Gis and the change amount of the image point position on the image plane that is generated in accordance with the displacement of the image-stabilizing lens unit Gis. As the value of this ration gets larger, a required change amount of the image point position can be obtained by a small displacement amount of the image-stabilizing lens unit Gis. The value of |(1−βis)βr| corresponds to the image stabilization sensitivity described above.

When the value of |(1−βis)βr| is beyond the upper limit of Condition (3), the displacement amount of the image-stabilizing lens unit Gis for obtaining a required image stabilization effect is too small, and it is difficult to control the displacement electrically or mechanically with high accuracy. On the other hand, when the value of |(1−βis)βr| is under the lower limit of Condition (3), the displacement amount of the image-stabilizing lens unit Gis during the image stabilization gets larger and it is not preferred because the driving mechanism is enlarged.

It is more preferred that a numerical range of Condition (3) be set as follows.

$$0.11 < |(1-\beta is)\beta r| < 0.5 \quad (3a)$$

In each embodiment, in order to further reduce the size of the image-stabilizing lens unit Gis, it is preferred that the following Condition (4) be met.

$$0.01 < |Lis/DL| < 0.15 \quad (4)$$

In Condition (4), Lis is a length on the optical axis of the image-stabilizing lens unit Gis (a distance from the surface closest to the object side to the surface closest to the image side of the image-stabilizing lens unit Gis).

Condition (4) is a condition that needs to appropriately set a ratio of the length Lis on the optical axis of the image-stabilizing lens unit Gis and the distance DL on the optical axis from the first surface to the final surface of the wide-angle lens.

When the length on the optical axis of the image-stabilizing lens unit Gis is so long that the value of |Lis/DL| is beyond the upper limit of Condition (4), it is not preferred because the size of the mechanism for the image stabilization gets larger. On the other hand, when the length on the optical axis of the image-stabilizing lens unit Gis is so short that the value of |Lis/DL| is under the lower limit of Condition (4), it is not preferred because it is difficult to manufacture the shape of the image-stabilizing lens unit Gis.

It is more preferred that a numerical range of Condition (4) be set as follows.

$$0.015 < |Lis/DL| < 0.1 \quad (4a)$$

In each embodiment, in order to reduce the size while maintaining the good optical performance, it is more preferred that the following Condition (5) be met.

$$1.0 < TL/f < 4.0 \quad (5)$$

In Condition (5), TL is a distance on the optical axis from the first surface of the wide-angle lens to the image plane (a so-called total lens length).

Condition (5) is a condition that needs to be met in order to set an appropriate ratio of the total lens length with respect to the focal length f of the whole lens system, and corresponds to a tele-ratio (a telephoto ratio) of the wide-angle lens. When the value of TL/f is beyond the upper limit of Condition (5), the reduction of the size of the wide-angle lens cannot be achieved. On the contrary, when the value of TL/f is under the lower limit of Condition (5), it is not preferred because it is difficult to achieve the good optical performance while ensuring a sufficient back focus.

It is more preferred that a numerical range of Condition (5) be set as follows.

$$1.5 < TL/f < 3.8 \quad (5a)$$

In each embodiment, the image-stabilizing lens unit Gis is configured by a single lens in order to achieve the reduction of the size and the high controllability of the image-stabilizing lens unit Gis and its driving mechanism. However, the image-stabilizing lens unit may also be configured by a plurality of lenses.

When the image-stabilizing lens unit Gis is configured by the single lens, it is preferred that the single lens be made of a glass material having Abbe's number vd which meets the following condition.

$$35 < vd \quad (6)$$

Condition (6) is a condition that appropriately set the Abbe's number of the glass material forming the single lens used for the image-stabilizing lens unit Gis. When the Abbe's number vd is under the lower limit of Condition (6), the dispersion of the glass material gets larger, and it is not preferred because the variation of the chromatic aberration is enlarged during the image stabilization. In order to reduce the variation of the chromatic aberration during the image stabilization, it is preferred that the chromatic aberration be corrected in the image-stabilizing lens unit in addition to the whole lens system. Particularly, when the image-stabilizing lens unit is constituted by the single lens, it is preferred that Condition (6) be met because the generation of the chromatic aberration is reduced as the dispersion of the glass material constituting the single lens is smaller.

It is more preferred that a numerical range of Condition (6) be set as follows.

$$45 < vd \quad (6a)$$

When the image-stabilizing lens unit is configured by the plurality of lenses, in view of the correction of the chromatic aberration, it is preferred that at least one lens of lenses having refractive powers of the same sign as that of the image-stabilizing lens unit Gis be made of the glass material which meets Condition (6) or Condition (6a).

Next, as Embodiment 8, a single-lens reflex camera using the wide-angle lens of Embodiments 1 to 7 as an interchangeable lens will be described with reference to FIG. 15. In the embodiment, the interchangeable lens will be described, and the wide-angle lens of Embodiments 1 to 7 may also be used as an image pickup apparatus (an optical apparatus) such as a lens-integrated still camera or video camera.

Figure 15:
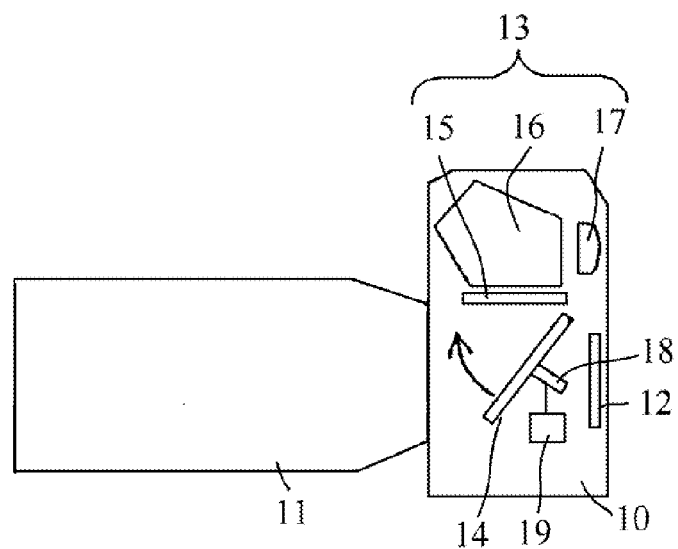
FIG. 15 is a schematic diagram of an image pickup apparatus in Embodiment 8 of the present invention.

In FIG. 15, reference numeral 10 denotes a single-lens reflex camera body, and reference numeral 11 denotes an interchangeable lens in which the wide-angle lens of Embodiments 1 to 7 is mounted. Reference numeral 12 denotes an image pickup element (a photoelectric conversion element) that performs a photoelectric conversion of an object image (an optical image) formed by the interchangeable lens 11. Reference numeral 13 denotes a finder optical system by which a user can observe the object image formed by the interchangeable lens 11. Reference numeral 14 denotes a quick return mirror that selectively introduces light beam from the interchangeable lens 11 into the image pickup element 12 and the finder optical system 13. When the object image is observed using the finder optical system 13, the object image that is imaged on a focus plate 15 via the quick return mirror 14 is changed to an erected image by a pentaprism 16 and then it is magnified by an eyepiece optical system 17 to be observed. Furthermore, the quick return mirror 14 is rotated to the outside of an optical path as indicated by an arrow during taking an image to form the object image on the image pickup element 12. Reference numeral 18 denotes a sub-mirror that introduces the light transmitted through the quick return mirror 14 into a focus detection unit 19.

Thus, the wide-angle lens of Embodiments 1 to is applied to an optical apparatus such as an interchangeable lens to be able to achieve an optical apparatus capable of obtaining a good wide-angle image.

Next, Embodiments 1 to 7 will be described in detail. In addition, a numeral example that corresponds to each embodiment will also be shown. In the numerical examples, a surface number indicates an order of a surface from the object side, reference symbol r denotes a radius of curvature, reference symbol d denotes a lens thickness or a lens interval, reference symbol nd denotes a refractive index for the d-line, reference symbol vd denotes Abbe's number, and reference symbol BF denotes a back focus value.

In each numerical example, an aspherical shape is defined by the following expression.

$$X = \frac{(h^2/r)}{1 + \sqrt{1 - (h/r)^2}} + Bh^4 + Ch^6 + Dh^8 + Eh^{10}$$

In the above expression, reference symbol X denotes a displacement amount of the lens surface in the optical axis direction at a position away from the optical axis by a height h.

In the expression, reference symbol r denotes a paraxial radius of curvature. Reference symbols B, C, D, and E denote fourth-order, sixth-order, eighth-order, and tenth-order aspherical surface coefficients, respectively. Description of "e±n" means "×10$^{±n}$". The aspherical surface is indicated by adding a symbol "*" at the right side of the surface number in surface data.

In Table 1, values of Conditions (1) to (6) in Embodiments 1 to 7 (Numerical examples 1 to 7) are shown collectively.

Embodiment 1

The wide-angle lens of Embodiment 1 that is illustrated in FIG. 1 is configured by nine lenses, and the image-stabilizing lens unit (the single lens) Gis is disposed at the object side relative to the stop SP. In the wide-angle lens of the present embodiment, the focusing from the infinity to the proximity is performed by moving the whole lens system to the object side.

Numerical example 1 that corresponds to the present embodiment will be indicated as follows. As is clear from FIGS. 2A and 2B, in the present embodiment (the numerical example), various kinds of aberrations are well corrected including during the image stabilization.

Numerical Example 1

Unit (mm)

Surface data

| Surface Number | r | d | nd | vd | Effective diameter |
|---|---|---|---|---|---|
| 1 | 73.071 | 2.86 | 1.48749 | 70.2 | 39.27 |
| 2 | 158.100 | 0.20 | | | 37.74 |
| 3 | 43.719 | 1.50 | 1.62041 | 60.3 | 33.30 |
| 4 | 21.265 | 4.81 | | | 28.28 |
| 5 | 94.052 | 1.50 | 1.51633 | 64.1 | 27.73 |
| 6 | 18.646 | 13.04 | | | 23.71 |
| 7 | 26.888 | 5.05 | 1.83400 | 37.2 | 18.50 |
| 8 | −27.438 | 1.60 | 1.72151 | 29.2 | 17.28 |
| 9 | 155.342 | 3.59 | | | 15.03 |
| 10 | 371.856 | 2.01 | 1.72916 | 54.7 | 14.08 |
| 11 | −174.698 | 1.80 | | | 13.91 |
| 12(Stop) | ∞ | 6.00 | | | 13.48 |
| 13 | −15.255 | 2.25 | 1.75520 | 27.5 | 12.45 |
| 14 | −154.557 | 3.42 | 1.65160 | 58.5 | 14.89 |
| 15 | −19.143 | 0.20 | | | 16.58 |
| 16* | −144.933 | 3.21 | 1.58313 | 59.4 | 18.22 |
| 17 | −22.756 | 38.04 | | | 19.30 |
| Image plane | ∞ | | | | |

Aspherical surface data
Sixteenth surface

B = −2.36449e−005 C = −4.91702e−009
D = −1.28509e−010 E = 0.00000e+000

Various kinds of data

| Focal length | 28.50 |
|---|---|
| Gis focal length | 163.26 |
| F-number | 2.86 |
| Angle of field | 37.20 |
| Image height | 21.64 |
| Total lens length | 91.07 |
| BF | 38.04 |

Embodiment 2

The wide-angle lens of Embodiment 2 that is illustrated in FIG. 3 is configured by eight lenses, and the image-stabilizing lens unit (the single lens) Gis is disposed at the object side relative to the stop SP. In the wide-angle lens of the present embodiment, the focusing from the infinity to the proximity is performed by moving the whole lens system to the object side.

Numerical example 2 that corresponds to the present embodiment will be indicated as follows. As is clear from FIGS. 4A and 4B, in the present embodiment (the numerical example), various kinds of aberrations are well corrected including during the image stabilization.

Numerical Example 2

Unit (mm)

Surface data

| Surface Number | r | d | nd | vd | Effective diameter |
|---|---|---|---|---|---|
| 1 | 76.313 | 3.60 | 1.51633 | 64.1 | 42.28 |
| 2 | 285.101 | 0.10 | | | 40.72 |
| 3 | 38.374 | 1.50 | 1.65160 | 58.5 | 33.88 |
| 4 | 19.300 | 6.42 | | | 28.16 |
| 5 | 261.911 | 1.50 | 1.58913 | 61.1 | 27.31 |
| 6 | 23.197 | 10.93 | | | 23.91 |
| 7 | 26.693 | 3.58 | 1.83481 | 42.7 | 19.01 |
| 8 | −1395.633 | 7.14 | | | 17.87 |
| 9 | 9611.001 | 1.79 | 1.72916 | 54.7 | 13.58 |
| 10 | −124.326 | 1.19 | | | 13.46 |
| 11(Stop) | ∞ | 4.00 | | | 13.18 |
| 12 | −16.832 | 3.00 | 1.80518 | 25.4 | 12.61 |
| 13 | 600.919 | 1.11 | | | 13.65 |
| 14 | 172.114 | 3.72 | 1.75500 | 52.3 | 16.23 |
| 15 | −21.371 | 0.68 | | | 17.61 |
| 16* | −156.061 | 2.75 | 1.58313 | 59.4 | 19.28 |
| 17 | −30.556 | 39.66 | | | 20.21 |
| Image plane | ∞ | | | | |

Aspherical surface data
Sixteenth surface

B = −2.13949e−005 C = −1.04037e−008
D = −9.66743e−011 E = 0.00000e+000

Various kinds of data

| Focal length | 28.49 |
|---|---|
| Gis focal length | 168.34 |
| F-number | 2.86 |
| Angle of field | 37.22 |
| Image height | 21.64 |
| Total lens length | 92.68 |
| BF | 39.66 |

Embodiment 3

The wide-angle lens of Embodiment 3 that is illustrated in FIG. 5 is configured by nine lenses, and the image-stabilizing lens unit (the single lens) Gis is disposed at the image side relative to the stop SP. In the wide-angle lens of the present embodiment, the focusing from the infinity to the proximity is performed by moving the whole lens system to the object side.

Numerical example 3 that corresponds to the present embodiment will be indicated as follows. As is clear from FIGS. 6A and 6B, in the present embodiment (the numerical example), various kinds of aberrations are well corrected including during the image stabilization.

Numerical Example 3

Unit (mm)

Surface data

| Surface Number | r | d | nd | vd | Effective diameter |
|---|---|---|---|---|---|
| 1 | 83.802 | 2.94 | 1.51633 | 64.1 | 39.17 |
| 2 | 245.595 | 0.10 | | | 37.66 |

-continued

| Unit (mm) | | | | | |
|---|---|---|---|---|---|
| 3 | 42.041 | 1.50 | 1.69680 | 55.5 | 32.50 |
| 4 | 20.238 | 3.95 | | | 27.43 |
| 5 | 46.879 | 1.50 | 1.51633 | 64.1 | 26.79 |
| 6 | 15.577 | 12.41 | | | 22.61 |
| 7 | 28.853 | 3.27 | 1.80400 | 46.6 | 18.31 |
| 8 | 2185.202 | 7.67 | | | 17.31 |
| 9 | −144.971 | 2.30 | 1.72916 | 54.7 | 14.61 |
| 10 | −30.589 | 1.00 | | | 14.64 |
| 11(Stop) | ∞ | 1.60 | | | 13.98 |
| 12 | 517.258 | 1.74 | 1.64000 | 60.1 | 13.41 |
| 13 | 83.976 | 3.13 | | | 12.98 |
| 14 | −15.944 | 1.63 | 1.76182 | 26.5 | 12.56 |
| 15 | 168.593 | 0.25 | | | 14.24 |
| 16 | 100.956 | 4.39 | 1.77250 | 49.6 | 15.11 |
| 17 | −23.537 | 0.80 | | | 17.19 |
| 18* | −72.175 | 2.84 | 1.58313 | 59.4 | 18.60 |
| 19 | −23.348 | 37.90 | | | 19.65 |
| Image plane | ∞ | | | | |
| Aspherical surface data | | | | | |
| Eighteenth surface | | | | | |

B = −2.48914e−005 C = −2.41786e−009
D = −2.62960e−010 E = 0.00000e+000

Various kinds of data

| Focal length | 28.27 |
|---|---|
| Gis focal length | −156.89 |
| F-number | 2.86 |
| Angle of field | 37.43 |
| Image height | 21.64 |
| Total lens length | 90.92 |
| BF | 37.90 |

Embodiment 4

The wide-angle lens of Embodiment 4 that is illustrated in FIG. 7 is configured by nine lenses, and the image-stabilizing lens unit (the single lens) Gis is disposed at the object side relative to the stop SP. In the wide-angle lens of the present embodiment, the focusing from the infinity to the proximity is performed by moving the whole lens system to the object side.

Numerical example 4 that corresponds to the present embodiment will be indicated as follows. As is clear from FIGS. 8A and 8B, in the present embodiment (the numerical example), various kinds of aberrations are well corrected including during the image stabilization.

Numerical Example 4

| Unit (mm) | | | | | |
|---|---|---|---|---|---|
| Surface Number | r | d | nd | vd | Effective diameter |
| 1 | 55.759 | 3.38 | 1.51633 | 64.1 | 40.31 |
| 2 | 114.479 | 0.20 | | | 38.73 |
| 3 | 43.822 | 1.50 | 1.62041 | 60.3 | 34.55 |
| 4 | 21.579 | 4.50 | | | 29.20 |
| 5 | 63.834 | 1.50 | 1.48749 | 70.2 | 28.64 |
| 6 | 17.764 | 14.96 | | | 24.16 |
| 7 | 26.654 | 4.18 | 1.83400 | 37.2 | 16.96 |
| 8 | −36.597 | 2.04 | 1.67270 | 32.1 | 15.71 |
| 9 | 46.052 | 2.43 | | | 14.08 |
| 10 | 196.376 | 2.15 | 1.72916 | 54.7 | 14.00 |
| 11 | −106.712 | 1.80 | | | 13.91 |
| 12(Stop) | ∞ | 6.66 | | | 13.54 |
| 13 | −13.039 | 1.00 | 1.75520 | 27.5 | 12.60 |
| 14 | −50.924 | 3.24 | 1.65160 | 58.5 | 14.48 |
| 15 | −15.351 | 0.20 | | | 16.09 |
| 16* | −102.727 | 3.31 | 1.58313 | 59.4 | 18.02 |
| 17 | −21.387 | 38.58 | | | 19.19 |
| Image plane | ∞ | | | | |
| Aspherical surface data | | | | | |
| Sixteenth surface | | | | | |

B = −2.36497e−005 C = −9.49950e−009
D = −9.09637e−011 E = 0.00000e+000

Various kinds of data

| Focal length | 28.59 |
|---|---|
| Gis focal length | 95.11 |
| F-number | 2.86 |
| Angle of field | 37.12 |
| Image height | 21.64 |
| Total lens length | 91.62 |
| BF | 38.58 |

Embodiment 5

The wide-angle lens of Embodiment 5 that is illustrated in FIG. 9 is configured by nine lenses, and the image-stabilizing lens unit (the single lens) Gis is disposed at the object side relative to the stop SP. In the wide-angle lens of the present embodiment, the focusing from the infinity to the proximity is performed by moving a lens unit L2 configured by seven lenses including the image-stabilizing lens unit Gis and the stop SP to the object side.

Numerical example 5 that corresponds to the present embodiment will be indicated as follows. As is clear from FIGS. 10A and 10B, in the present embodiment (the numerical example), various kinds of aberrations are well corrected including during the image stabilization.

Numerical Example 5

| Unit (mm) | | | | | |
|---|---|---|---|---|---|
| Surface Number | r | d | nd | vd | Effective diameter |
| 1 | 123.571 | 2.61 | 1.48749 | 70.2 | 43.66 |
| 2 | 328.993 | 0.20 | | | 42.18 |
| 3 | 41.247 | 1.50 | 1.62041 | 60.3 | 35.62 |
| 4 | 21.552 | 12.06 | | | 30.26 |
| 5 | 128.134 | 1.50 | 1.51633 | 64.1 | 22.77 |
| 6 | 17.488 | 8.48 | | | 19.59 |
| 7 | 24.155 | 4.37 | 1.83400 | 37.2 | 16.29 |
| 8 | −29.326 | 1.60 | 1.72825 | 28.5 | 15.11 |
| 9 | 219.691 | 2.11 | | | 14.23 |
| 10 | 4173.160 | 1.80 | 1.72916 | 54.7 | 13.98 |
| 11 | −135.601 | 2.00 | | | 13.86 |
| 12(Stop) | ∞ | 6.00 | | | 13.41 |
| 13 | −15.119 | 1.78 | 1.75520 | 27.5 | 12.45 |
| 14 | −204.534 | 3.76 | 1.65160 | 58.5 | 14.48 |
| 15 | −17.650 | 0.20 | | | 16.35 |
| 16* | −120.626 | 3.00 | 1.58313 | 59.4 | 17.95 |
| 17 | −23.486 | 37.90 | | | 19.02 |
| Image plane | ∞ | | | | |
| Aspherical surface data | | | | | |
| Sixteenth surface | | | | | |

B = −2.57033e−005 C = −2.05401e−009
D = −5.98214e−010 E = 2.17418e−012

Various kinds of data

| Focal length | 28.12 |
|---|---|
| Gis focal length | 180.15 |

-continued

| Unit (mm) | |
|---|---|
| F-number | 2.87 |
| Angle of field | 37.58 |
| Image height | 21.64 |
| Total lens length | 90.86 |
| BF | 37.90 |

Embodiment 6

The wide-angle lens of Embodiment 6 that is illustrated in FIG. 11 is configured by ten lenses, and the image-stabilizing lens unit (the single lens) Gis is disposed at the object side relative to the stop SP. One lens is disposed between the stop SP and the image-stabilizing lens unit.

In the wide-angle lens of the present embodiment, the focusing from the infinity to the proximity is performed by moving the whole lens system to the object side.

Numerical example 6 that corresponds to the present embodiment will be indicated as follows. As is clear from FIGS. 12A and 12B, in the present embodiment (the numerical example), various kinds of aberrations are well corrected including during the image stabilization.

Numerical Example 6

| Surface Number | r | d | nd | vd | Effective diameter |
|---|---|---|---|---|---|
| 1 | 63.729 | 3.73 | 1.51633 | 64.1 | 42.02 |
| 2 | 154.249 | 0.10 | | | 40.04 |
| 3 | 67.160 | 2.03 | 1.74400 | 44.8 | 36.77 |
| 4 | 22.414 | 3.97 | | | 29.70 |
| 5 | 52.136 | 3.57 | 1.65160 | 58.5 | 29.22 |
| 6 | −452.984 | 0.20 | | | 28.07 |
| 7 | 31.951 | 1.59 | 1.60738 | 56.8 | 22.98 |
| 8 | 11.308 | 7.54 | | | 17.67 |
| 9* | −33.378 | 2.50 | 1.58313 | 59.4 | 15.50 |
| 10 | −46.627 | 1.42 | | | 15.50 |
| 11 | 30.194 | 7.69 | 1.84666 | 23.9 | 12.93 |
| 12 | 85.014 | 2.99 | | | 13.04 |
| 13(Stop) | ∞ | 1.00 | | | 13.48 |
| 14 | 522.202 | 2.89 | 1.77250 | 49.6 | 13.65 |
| 15 | −23.193 | 3.64 | | | 13.79 |
| 16 | −15.762 | 1.80 | 1.80518 | 25.4 | 12.59 |
| 17 | 133.163 | 0.45 | | | 13.99 |
| 18 | 859.482 | 3.20 | 1.72916 | 54.7 | 14.62 |
| 19 | −19.477 | 0.15 | | | 15.95 |
| 20* | −34.964 | 2.54 | 1.58313 | 59.4 | 16.63 |
| 21 | −17.848 | 37.90 | | | 17.70 |
| Image plane | ∞ | | | | |

Aspherical surface data
Ninth surface

B = 7.32644e−007 C = −6.31619e−008
D = 4.06310e−010 E = −1.89510e−012
Twentieth surface B = −2.72628e−005 C = 7.14587e−008
D = −1.82055e−009 E = 1.03238e−011
Various kinds of data

| | |
|---|---|
| Focal length | 24.50 |
| Gis focal length | −216.50 |
| F-number | 2.86 |
| Angle of field | 41.45 |
| Image height | 21.64 |
| Total lens length | 90.90 |
| BF | 37.90 |

Embodiment 7

The wide-angle lens of Embodiment 7 that is illustrated in FIG. 13 is configured by seven lenses, and the image-stabilizing lens unit (the single lens) Gis is disposed at the image side relative to the stop SP. In the wide-angle lens of the present embodiment, the focusing from the infinity to the proximity is performed by moving the whole lens system to the object side.

Numerical example 7 that corresponds to the present embodiment will be indicated as follows. As is clear from FIGS. 14A and 14B, in the present embodiment (the numerical example), various kinds of aberrations are well corrected including during the image stabilization.

Numerical Example 7

| Unit (mm) | | | | | |
|---|---|---|---|---|---|
| Surface data | | | | | |
| Surface Number | r | d | nd | vd | Effective diameter |
| 1 | 87.691 | 1.50 | 1.51633 | 64.1 | 30.46 |
| 2 | 18.940 | 13.83 | | | 25.76 |
| 3 | ∞ | 5.38 | | | 22.47 |
| 4 | 31.052 | 12.52 | 1.77250 | 49.6 | 26.26 |
| 5 | −25.943 | 1.49 | 1.63980 | 34.5 | 25.20 |
| 6 | −122.370 | 1.99 | | | 24.04 |
| 7(Stop) | ∞ | 2.61 | | | 22.47 |
| 8 | 226.185 | 1.15 | 1.77250 | 49.6 | 20.73 |
| 9 | 79.775 | 6.46 | | | 20.15 |
| 10 | −16.669 | 1.47 | 1.69895 | 30.1 | 18.76 |
| 11 | 74.368 | 4.97 | 1.80400 | 46.6 | 20.27 |
| 12 | −21.842 | 0.20 | | | 20.88 |
| 13* | −112.086 | 2.70 | 1.58313 | 59.4 | 22.07 |
| 14 | −42.096 | 37.76 | | | 23.10 |
| Image plane | ∞ | | | | |

Aspherical surface data
Thirteenth surface

B = −1.61591e−005 C = −1.80077e−008
D = −7.62243e−011 E = 0.00000e+000
Various kinds of data

| | |
|---|---|
| Focal length | 35.48 |
| Gis focal length | −160.08 |
| F-number | 2.05 |
| Angle of field | 31.37 |
| Image height | 21.64 |
| Total lens length | 94.03 |
| BF | 37.76 |

TABLE 1

| Con-dition | Numerical Example | | | | | | |
|---|---|---|---|---|---|---|---|
| | 1 | 2 | 3 | 4 | 5 | 6 | 7 |
| (1) | 0.175 | 0.169 | −0.180 | 0.301 | 0.156 | −0.113 | −0.222 |
| (2) | −0.072 | −0.056 | 0.063 | −0.075 | −0.072 | −0.276 | 0.067 |
| (3) | 0.238 | 0.224 | 0.234 | 0.410 | 0.214 | 0.129 | 0.252 |
| (4) | 0.038 | 0.034 | 0.033 | 0.041 | 0.034 | 0.047 | 0.020 |
| (5) | 3.196 | 3.253 | 3.216 | 3.205 | 3.231 | 3.710 | 2.650 |
| (6) | 54.7 | 54.7 | 60.1 | 54.7 | 54.7 | 59.4 | 49.6 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-177018, filed on Aug. 6, 2010, which is hereby incorporated by reference herein in its entirety.

What is claimed is:

1. A fixed focal length lens comprising:
   an aperture stop; and
   an image-stabilizing lens unit configured to move in a direction including a component of a direction orthogonal to an optical axis to reduce an image blur,
   wherein the following conditions are met:

$0.1 < f/|fis| < 0.5;$ $-0.35 < Dis/DL < 0.25;$ and $0.1 < |(1-\beta is)\beta r| < 0.65,$ where f is a focal length of the fixed focal length lens, fis is a focal length of the image-stabilizing lens unit, Dis is a distance on the optical axis from the aperture stop to a surface farthest from the aperture stop of the image-stabilizing lens unit, DL is a distance on the optical axis from a first surface closest to an object side to a final surface closest to an image side of the fixed focal length lens, a sign of the distance on the optical axis is positive in a direction from the object side to the image side, βis is a lateral magnification of the image-stabilizing lens unit, βr is a lateral magnification of a lens system that is positioned at the image side relative to the image-stabilizing lens unit, and each of the lateral magnifications is a value obtained in a state where the fixed focal length lens is focused on an infinity,
   wherein the focal length of the fixed focal length lens is shorter than a back focus of the fixed focal length lens.

2. The fixed focal length lens according to claim 1, wherein the following condition is met:

$0.01 < |Lis/DL| < 0.15,$ where Lis is a distance on the optical axis from a surface closest to the object side to a surface closest to the image side of the image-stabilizing lens unit.

3. The fixed focal length lens according to claim 1, wherein the following condition is met:

$1.0 < TL/f < 4.0,$ where TL is a distance on the optical axis from the first surface to an image plane.

4. The fixed focal length lens according to claim 1, wherein the image-stabilizing lens unit comprises a single lens.

5. An optical apparatus comprising:
   a fixed focal length lens having a focal length that is shorter than a back focus thereof; and
   an image pickup device that receives an image via the fixed focal length lens,
   wherein the fixed focal length lens comprises:
   an aperture stop; and
   an image-stabilizing lens unit configured to move in a direction including a component of a direction orthogonal to an optical axis to reduce an image blur,
   wherein the following conditions are met:

$0.1 < f/|fis| < 0.5;$ $-0.35 < Dis/DL < 0.25;$ and $0.1 < |(1-\beta is)\beta r| < 0.65,$ where f is the focal length of the fixed focal length lens, fis is a focal length of the image-stabilizing lens unit, Dis is a distance on the optical axis from the aperture stop to a surface farthest from the aperture stop of the image-stabilizing lens unit, DL is a distance on the optical axis from a first surface closest to an object side to a final surface closest to an image side of the fixed focal length lens, and a sign of the distance on the optical axis is positive in a direction from the object side to the image side, βis is a lateral magnification of the image-stabilizing lens unit, βr is a lateral magnification of a lens system that is positioned at the image side relative to the image-stabilizing lens unit, and each of the lateral magnifications is a value obtained in a state where the fixed focal length lens is focused on an infinity.

* * * * *